US012548581B2

(12) United States Patent
Ni et al.

(10) Patent No.: US 12,548,581 B2
(45) Date of Patent: Feb. 10, 2026

(54) ECHO CANCELLATION METHOD AND APPARATUS, DEVICE, AND STORAGE MEDIUM

(71) Applicant: VIVO MOBILE COMMUNICATION CO., LTD., Dongguan (CN)

(72) Inventors: Zhong Ni, Dongguan (CN); Liangbing Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 224 days.

(21) Appl. No.: 18/369,134

(22) Filed: Sep. 15, 2023

(65) Prior Publication Data

US 2024/0005940 A1 Jan. 4, 2024

Related U.S. Application Data

(63) Continuation of application No. PCT/CN2022/080048, filed on Mar. 10, 2022.

(30) Foreign Application Priority Data

Mar. 17, 2021 (CN) .......................... 202110284766.7

(51) Int. Cl.
*G10L 21/0208* (2013.01)
*G10L 21/0224* (2013.01)
*G10L 15/22* (2006.01)

(52) U.S. Cl.
CPC ...... *G10L 21/0224* (2013.01); *G10L 21/0208* (2013.01); *G10L 15/22* (2013.01); *G10L 2021/02082* (2013.01)

(58) Field of Classification Search
CPC ....... G10L 2021/02082; G10L 21/0208; G10L 2021/02166; G10L 15/22; G10L 15/02;
(Continued)

(56) References Cited

U.S. PATENT DOCUMENTS 5,774,562 A * 6/1998 Furuya .................... H04R 3/00
379/406.06
8,660,281 B2 * 2/2014 Bouchard .............. H04R 25/43
704/226
(Continued)

FOREIGN PATENT DOCUMENTS

CN 107680603 A 2/2018
CN 111031448 A 4/2020
(Continued)

OTHER PUBLICATIONS

International Search Report issued in corresponding International Application No. PCT/CN2022/080048, mailed May 26, 2022, 4 pages.
(Continued)

*Primary Examiner* — Vijay B Chawan
(74) *Attorney, Agent, or Firm* — IPX PLLC

(57) ABSTRACT

An echo cancellation method and apparatus, a device, and a storage medium, are provided. The echo cancellation method includes: obtaining a plurality of reverberation features of a first target speech signal, where the plurality of reverberation features are signal features related to reverberation times; respectively determining, according to each reverberation feature of the first target speech signal and a preset mapping relationship between the reverberation feature and a reverberation time estimate, the reverberation time estimate corresponding to each reverberation feature of the first target speech signal; determining a global reverberation time of the first target speech signal according to reverberation time estimates respectively corresponding to a plurality of reverberation features of the first target speech signal; adjusting a length of an echo transfer function according to the global reverberation time; and eliminating
(Continued)

an echo of the first target speech signal according to the adjusted length of the echo transfer function.

18 Claims, 5 Drawing Sheets

(58) Field of Classification Search
CPC .......... G10L 15/16; G10L 2021/02163; G10L 21/0216; G10L 21/0224; G10L 21/0364; G10L 21/02; G10L 25/20; G10L 25/84; G10L 25/78; G10L 25/90; H04R 3/02; H04R 2225/43; H04R 1/1083; H04R 2410/01; H04R 2460/01
USPC ......................................... 704/226
See application file for complete search history.

(56) References Cited

U.S. PATENT DOCUMENTS

| | | | | |
|---|---|---|---|---|
| 9,491,545 | B2* | 11/2016 | Iyengar | H04M 9/082 |
| 11,074,924 | B2* | 7/2021 | Geng | G10L 21/0208 |
| 11,749,262 | B2* | 9/2023 | Gao | G10L 15/02 |
| | | | | 704/200 |
| 2006/0115095 | A1* | 6/2006 | Giesbrecht | H04M 9/08 |
| | | | | 381/63 |
| 2008/0059157 | A1* | 3/2008 | Fukuda | G10L 21/02 |
| | | | | 704/211 |
| 2009/0316923 | A1* | 12/2009 | Tashev | H04R 3/005 |
| | | | | 381/71.1 |
| 2011/0268283 | A1* | 11/2011 | Nakadai | H04R 3/04 |
| | | | | 381/56 |
| 2011/0305345 | A1* | 12/2011 | Bouchard | G10L 21/0208 |
| | | | | 704/226 |
| 2015/0016622 | A1* | 1/2015 | Togami | H04R 3/002 |
| | | | | 381/66 |
| 2019/0035415 | A1* | 1/2019 | Lu | G10L 21/0364 |
| 2021/0304735 | A1* | 9/2021 | Gao | H04R 3/005 |
| 2024/0005940 | A1* | 1/2024 | Ni | G10L 21/0208 |
| 2024/0379089 | A1* | 11/2024 | Eronen | H04S 7/306 |

FOREIGN PATENT DOCUMENTS

| | | |
|---|---|---|
| CN | 113077804 A | 7/2021 |
| JP | 2011065128 A | 3/2011 |

OTHER PUBLICATIONS

First Office Action issued in related Chinese Application No. 202110284766.7, mailed Jan. 28, 2023, 5 pages.

* cited by examiner

ECHO CANCELLATION METHOD AND APPARATUS, DEVICE, AND STORAGE MEDIUM

CROSS-REFERENCE TO RELATED APPLICATIONS

This application is a continuation of International Application No PCT/CN2022/080048, filed on Mar. 10, 2022, which claims priority to Chinese Patent Application No. 202110284766.7, filed Mar. 17, 2021. The entire contents of each of the above-identified applications are expressly incorporated herein by reference.

TECHNICAL FIELD

The present application is directed to the technical field of communication, and specifically relates to an echo cancellation method and apparatus, a device, and a storage medium.

BACKGROUND

In the process of calls through electronic devices, echo signals are often generated due to the complexity of speech scenarios, such as the existence of reverberation, the existence of near-end noise, unstable system delays, and frame losses. The existence of the echo signals leads to poor call quality. In order to ensure the user call quality, at this stage, an echo in a speech signal is usually eliminated based on an echo transfer function.

Lengths of the echo transfer function in speech signals in different call scenarios may be different. Therefore, the existing echo cancellation solution may have high resource costs or poor echo cancellation effects.

SUMMARY

The embodiments of the present application provide an echo cancellation method and apparatus, a device, and a storage medium.

According to a first aspect, the embodiment of the present application provides an echo cancellation method, which includes:
  obtaining a plurality of reverberation features of a first target speech signal, where the plurality of reverberation features are a plurality of signal features related to reverberation times;
  respectively determining, according to each reverberation feature of the first target speech signal and a preset mapping relationship between the reverberation feature and a reverberation time estimate, the reverberation time estimate corresponding to each reverberation feature of the first target speech signal; where the preset mapping relationship between each reverberation feature of the first target speech signal and the reverberation time estimate is a mapping relationship obtained based on a corresponding reverberation feature of a historical speech signal and a reverberation time corresponding to the reverberation feature;
  determining a global reverberation time of the first target speech signal according to reverberation time estimates respectively corresponding to a plurality of reverberation features of the first target speech signal;
  adjusting a length of an echo transfer function according to the global reverberation time; and
  eliminating an echo of the first target speech signal according to the adjusted length of the echo transfer function.

According to a second aspect, an embodiment of the present application provides an echo cancellation apparatus, which includes:
  an obtaining module, configured to obtain a plurality of reverberation features of a first target speech signal, where the plurality of reverberation features are a plurality of signal features related to reverberation times;
  a first determination module, configured to respectively determine, according to each reverberation feature of the first target speech signal and a preset mapping relationship between the reverberation feature and a reverberation time estimate, the reverberation time estimate corresponding to each reverberation feature of the first target speech signal; where the preset mapping relationship between each reverberation feature of the first target speech signal and the reverberation time estimate is a mapping relationship obtained based on a corresponding reverberation feature of a historical speech signal and a reverberation time corresponding to the reverberation feature;
  a second determination module, configured to determine a global reverberation time of the first target speech signal according to reverberation time estimates respectively corresponding to a plurality of reverberation features of the first target speech signal;
  an adjustment module, configured to adjust a length of an echo transfer function according to the global reverberation time; and
  an elimination module, configured to eliminate an echo of the first target speech signal according to the adjusted length of the echo transfer function.

According to a third aspect, an embodiment of this application provides an electronic device. The electronic device includes a processor, a memory, and a program or an instruction stored in the memory and capable of running on the processor. When the program or the instruction is executed by the processor, the steps of the method according to the first aspect are implemented.

According to a fourth aspect, an embodiment of this application provides a readable storage medium. The readable storage medium stores a program or an instruction, and when the program or the instruction is executed by a processor, steps of the method according to the first aspect are implemented.

According to a fifth aspect, an embodiment of this application provides a chip. The chip includes a processor and a communications interface, the communications interface is coupled to the processor, and the processor is configured to run a program or an instruction, to implement the method according to the first aspect.

DETAILED DESCRIPTION

Figure 1:
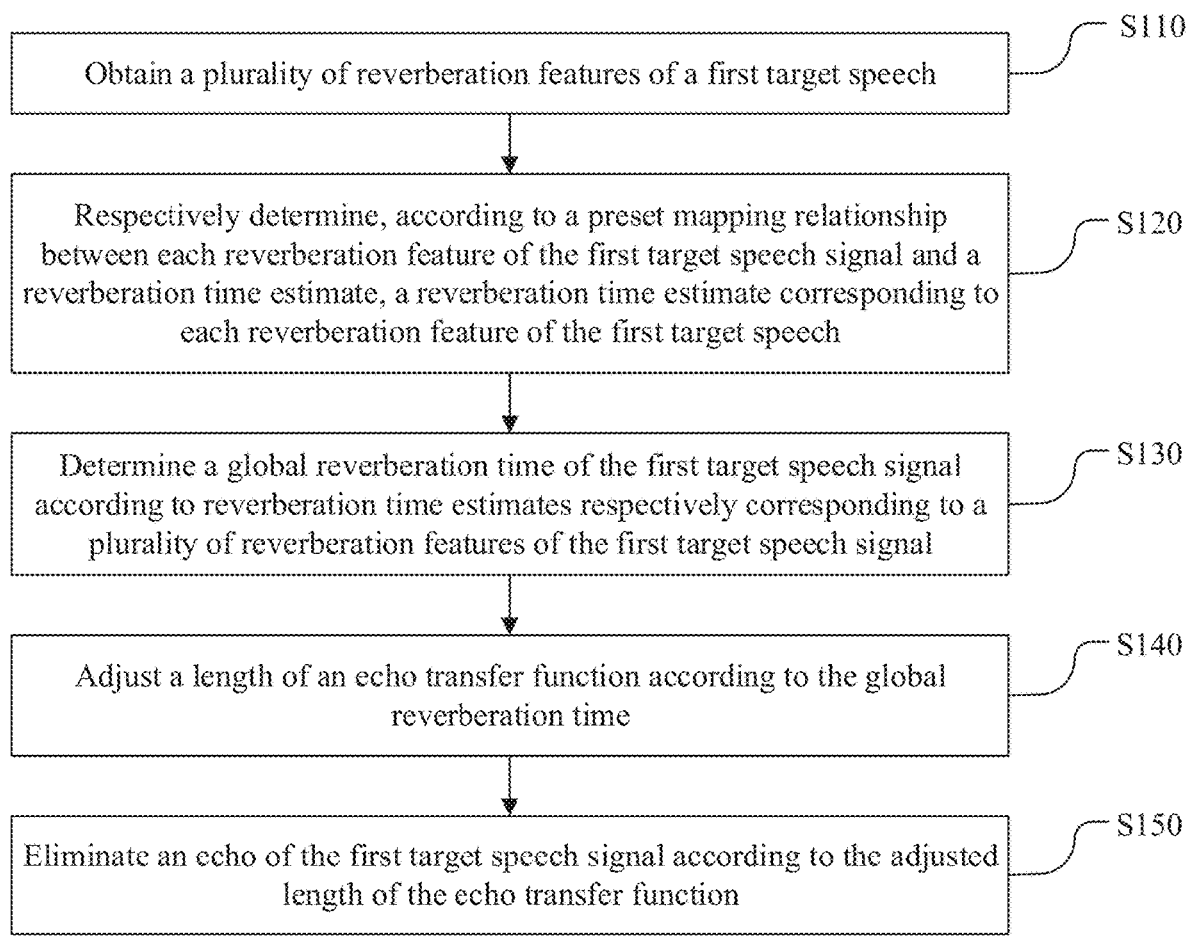
FIG. 1 is a flowchart of an echo cancellation method provided in an embodiment of the present application.

The following describes the embodiments of this application with reference to the accompanying drawings in the embodiments of this application. Apparently, the described embodiments are some but not all of the embodiments of this application.

The terms "first," "second," and the like in the description and the claims of this application are used to distinguish between similar objects, and do not need to be used to describe a specific order or sequence. It should be understood that, terms termed in such a way is interchangeable in proper circumstances, so that the embodiments of this application can be implemented in an order other than the order illustrated or described herein. In addition, in the specification and the claims, "and/or" represents at least one of connected objects, and a character "/" generally represents an "or" relationship between associated objects.

Based on the background technology, it can be seen that in the existing echo cancellation solution, lengths of the echo transfer function in speech signals in different call scenarios may be different, resulting in technical problems of high resource costs or poor echo cancellation effects.

In some implementations, the core of the echo cancellation solution is to accurately estimate the echo transfer function of the speech signal, and eliminate the echo in the speech signal according to the length of the echo transfer function. However, in the current echo cancellation solution, the length of the echo transfer function (that is, a length of a filter) is usually pre-designed, that is, the length of the echo transfer function in the existing echo cancellation solution is fixed. In this way, if the length of the echo transfer function is set too long, resources will be wasted, and if the length of the echo transfer function is set too short, the echo cancellation effect will be poor, resulting in that the existing echo cancellation method cannot respond well to changes in a speech scenario.

Based on the above findings, the present application provides an echo cancellation method and apparatus, a device, and a storage medium. In the present application, the global reverberation time is determined according to the reverberation time estimates corresponding to the plurality of reverberation features related to reverberation times in the first target speech signal, and the length of the echo transfer function is adjusted based on the global reverberation time, so as to eliminate the echo of the first target speech signal according to the adjusted length of the echo transfer function, and the reverberation time estimate corresponding to each reverberation feature is determined based on each reverberation feature and the preset mapping relationship between the reverberation feature and the reverberation time estimate. In this way, adjusting the length of the echo transfer function based on the global reverberation time of the first target speech signal can realize dynamic control of the length of the echo transfer function, so that the length of the echo transfer function can better meet actual needs. In this way, not only can the waste of resources caused by the long length of the echo transfer function be avoided, but also the poor effect of echo cancellation caused by the short length of the echo transfer function can be avoided, thereby better improving call quality and user experience.

The echo cancellation method provided by the embodiment of the present application will be described in detail below through specific embodiments and application scenarios with reference to the accompanying drawings.

FIG. 1 is a flowchart of an echo cancellation method provided in an embodiment of the present application. The method can be applied to electronic devices. As shown in FIG. 1, the echo cancellation method may include the following steps:

S110. Obtain a plurality of reverberation features of a first target speech signal.

The plurality of reverberation features may be a plurality of signal features related to reverberation times, and the signal feature may be used to represent the power attenuation and power slope of the speech signal.

As an example, when the user calls through the electronic device, the electronic device may receive a speech signal, that is, the first target speech signal. After receiving the first target speech signal, the electronic device may obtain a plurality of signal features related to reverberation times in the first target speech signal, that is, a plurality of reverberation features.

S120. Respectively determine, according to a preset mapping relationship between each reverberation feature of the first target speech signal and a reverberation time estimate, a reverberation time estimate corresponding to each reverberation feature of the first target speech signal.

The preset mapping relationship between each reverberation feature of the first target speech signal and the reverberation time estimate may be a mapping relationship obtained based on a corresponding reverberation feature of a historical speech signal and a reverberation time corresponding to the reverberation feature. There is a preset mapping relationship between each reverberation feature and the reverberation time corresponding to the reverberation feature. Assuming that the signal features include signal feature A, signal feature B, and signal feature C, the preset mapping relationship should also include a preset mapping relationship A between signal feature A and a reverberation time corresponding to signal feature A, a preset mapping relationship B between signal feature B and a reverberation time corresponding to signal feature B, and a preset mapping relationship C between signal feature C and a reverberation time corresponding to signal feature C. The preset mapping relationship can be pre-counted and pre-loaded in the electronic device, or can be loaded by the electronic device when determining the reverberation time estimate corresponding to each signal feature.

As an example, after obtaining a plurality of reverberation features of the first target speech signal, each reverberation feature and a preset mapping relationship between the reverberation feature and the reverberation time estimate may be obtained. According to each reverberation feature and the preset mapping relationship between the reverberation feature and the reverberation time estimate, the reverberation time estimate corresponding to each reverberation feature of the first target speech signal may be respectively determined, where each reverberation time estimate can be used to represent the reverberation times of different periods in the first target speech signal.

It can be understood that the historical speech signal and the first target speech signal may be speech signals received by the same electronic device or electronic device of the same model; the historical speech signal and the first target speech signal may be received when the electronic device is in the same call scenario; or the historical speech signal and the first target speech signal may also be received by the same electronic device or electronic device of the same model in the same call scenario. In this way, the preset mapping relationship obtained based on the corresponding reverberation feature of the historical speech signal and the reverberation time corresponding to the reverberation feature is corresponding to the first target speech signal. In this way, the accuracy of the reverberation time estimate corresponding to each reverberation feature of the first target speech signal that is determined based on each reverberation feature of the first target speech signal and the preset mapping relationship between the reverberation feature and the reverberation time estimate can be improved, improving the accuracy of the global reverberation time of the first target speech signal, which can further improve the call quality and user experience.

S130. Determine a global reverberation time of the first target speech signal according to reverberation time estimates respectively corresponding to a plurality of reverberation features of the first target speech signal.

As an example, after the reverberation time estimate corresponding to each reverberation feature of the first target speech signal is determined, the global reverberation time of the first target speech signal can be determined according to reverberation time estimates respectively corresponding to a plurality of reverberation features of the speech signal. In this way, since each reverberation time estimate can be used to represent the reverberation times of different periods in the first target speech signal, the global reverberation time of the first target speech signal determined based on the reverberation time estimates corresponding to different reverberation features is more consistent with the real reverberation time of the first target speech signal, and the accuracy of the global reverberation time of the first target speech signal is improved.

S140. Adjust a length a an echo transfer function according to the global reverberation time.

As an example, after the global reverberation time of the first target speech signal is determined, the length of the echo transfer function may be adjusted according to the global reverberation time to obtain an adjusted length of the echo transfer function. In this way, the adjusted length of the echo transfer function can be made more in line with the actual situation of the first target speech signal.

S150. Eliminate an echo of the first target speech signal according to the adjusted length of the echo transfer function.

As an example, after the length of the echo transfer function is adjusted according to the global reverberation time, echo cancellation may be performed on the first target speech signal according to the adjusted length of the echo transfer function, so as to cancel the echo of the first target speech signal. In this way, since the adjusted length of the echo transfer function is more in line with the actual situation of the first target speech signal, eliminating the echo of the first target speech signal based on the adjusted echo transfer function can make the echo cancellation effect better, and can also avoid the waste of resources caused by long cancellation setting of the echo transfer function.

In the embodiments of the present application, the global reverberation time is determined according to the reverberation time estimates corresponding to the plurality of reverberation features related to reverberation times in the first target speech signal, and the length of the echo transfer function is adjusted based on the global reverberation time, so as to eliminate the echo of the first target speech signal according to the adjusted length of the echo transfer function, and the reverberation time estimate corresponding to each reverberation feature is determined based on each reverberation feature and the preset mapping relationship between the reverberation feature and the reverberation time estimate. In this way, adjusting the length of the echo transfer function based on the global reverberation time of the first target speech signal can realize dynamic control of the length of the echo transfer function, so that the length of the echo transfer function can better meet actual needs. In this way, not only can the waste of resources caused by the long length of the echo transfer function be avoided, but also the poor effect of echo cancellation caused by the short length of the echo transfer function can be avoided, thereby better improving call quality and user experience.

In some embodiments, a plurality of reverberation features related to the reverberation times may be determined based on a logarithmic power sequence of an echo path of the first target speech signal. Correspondingly, the specific implementation of the above step S110 may be as follows:

determining an echo path of the first target speech signal;

removing power with a value of zero among power of the echo path to obtain the logarithmic power sequence of the echo path; and obtaining a plurality of reverberation features based on logarithmic power in different sequence segments;

where the logarithmic power sequence may include Q sequence segments, and Q is a positive integer.

As an example, when obtaining a plurality of reverberation features related to the reverberation times in the first target speech signal, the echo path of the first target speech signal can be determined first, for example, the echo path of the first target speech signal can be estimated by an adaptive filter. Then, the power of the echo path is analyzed to obtain a power sequence corresponding to the echo path, power with a value of zero in the power sequence is removed, to obtain the logarithmic power sequence of the echo path, and the logarithmic power sequence may be divided into Q sequence segments, where each sequence segment may include a preset number of logarithmic powers, for example, the preset number may be a product of a preset duration (such as 30 ms) and a sampling frequency. Then, a plurality of reverberation features related to reverberation times in the first target speech signal may be obtained based on logarithmic powers in different sequence segments in the logarithmic power sequence.

In this way, based on the power of different sequence segments in the Q sequence segments of the logarithmic power sequence, the plurality of reverberation features can be obtained, so that the obtained plurality of reverberation features can better represent power characteristics of different sequence segments of the first target speech signal, which can provide a more accurate data basis for the determination of the global reverberation time, and can further make the length of the echo transfer function more in line with actual needs and improve call quality and user experience.

In some embodiments, the plurality of reverberation features related to the reverberation times in the first target speech signal may include a first power attenuation value, a second power attenuation value, and a mean power fitting slope.

The first power attenuation value is a power attenuation value of the first N sequence segments in the Q sequence segments; the second power attenuation value is the power attenuation value of the L sequence segments after the sequence segment in the Q sequence segments; and the mean power fitting slope is obtained through fitting based on the mean logarithmic power sequence of the logarithmic power sequence.

Correspondingly, at this time, the specific implementation of obtaining a plurality of reverberation features based on the logarithmic power in different sequence segments can be as follows:

calculating at least one first difference sequence of every two adjacent sequence segments of the first N sequence segments of the Q sequence segments;

determining a first power attenuation value according to the first difference sequence;

calculating at least one second difference sequence of every two adjacent sequence segments of L sequence segments of the Q sequence segments;

determining a second power attenuation value according to the second difference sequence;

processing the logarithmic power sequence by an FIR filter to obtain a mean logarithmic power sequence of the logarithmic power sequence;

selecting a continuous power sequence segment within a preset interval range in the mean logarithmic power sequence; and obtaining a mean power fitting slope through fitting according to the continuous power sequence segment.

N is a positive integer and N<Q. The L sequence segments are L sequence segments after the $(N-1)^{th}$ sequence segment of the Q sequence segments, and L is a positive integer.

As an example, when determining the first power attenuation value, at least one difference sequence of every two adjacent sequence segments of the first N sequence segments of the Q sequence segments of the logarithmic power sequence can be calculated, that is, at least one first difference sequence. Then, the power attenuation value can be determined according to the first difference sequence, that is, the first power attenuation value. Since the first power attenuation value is determined based on the first N sequence segments of the Q sequence segments, the first power attenuation value may represent the power attenuation of the first N sequence segments of the logarithmic power sequence, and the first power attenuation value may also be referred to as a header power attenuation value. Taking N as 2 as an example, the first sequence segment of the Q sequence segments can be compared with the second sequence segment of the Q sequence segments, to obtain the difference sequence between the first sequence segment and the second sequence segment, that is, the first difference sequence, and then the mean value of the first difference sequence is used as the first power attenuation value.

When determining the second power attenuation value, at least one difference between every two adjacent sequence segments of the L sequence segments after the $(N-1)^{th}$ sequence segment of the Q sequence segments of the logarithmic power sequence can be calculated, that is, at least one second difference sequence. Then, the power attenuation value can be determined according to the second difference sequence, that is, the second power attenuation value. Since the second power attenuation value is determined based on the L sequence segments after the $(N-1)^{th}$ sequence segment of the Q sequence segments, the second power attenuation value may represent the power attenuation of the middle L sequence segments of the logarithmic power sequence, and the second power attenuation value may also be referred to as a middle power attenuation value. For example, taking N as 2 and L as 2 as an example, the first sequence segment of the Q sequence segments can be compared with the second sequence segment of the Q sequence segments, to obtain the first difference sequence, the mean value of the first difference sequence is used as the first power attenuation value, the second sequence segment is compared with the third sequence segment, to obtain the second difference sequence, and the mean value of the second difference sequence is used as the second power attenuation value.

When determining the mean power fitting slope, the logarithmic power sequence can be calculated and input to the Finite Impulse Response (FIR) filter, to obtain the mean logarithmic power sequence, where the FIR filter is a mean FIR filter, and the length of the FIR filter can be set to around 40. Then, a continuous power sequence segment within a preset interval range in the mean logarithmic power sequence may be selected; and for example, the preset interval range can be (−76, −30). Afterwards, a linear-logarithmic power sequence can be constructed based on the continuous power sequence segment, and then a linear fitting is performed on the linear-logarithmic power sequence to obtain a fitting slope, that is, a mean power fitting slope.

In this way, determining the first power attenuation value, the second power attenuation value, and the mean power fitting slope based on different sequence segments of the Q sequence segments of the logarithmic power sequence can make the acquired reverberation features more accurately represent the power features of different sequence segments of the first target speech signal, and provide a more accurate data basis for determining the global reverberation time, which can further make the length of the echo transfer function more in line with actual needs and improve call quality and user experience.

In some embodiments, the implementation method of the above step S120 may be as follows:

determining a first reverberation time estimate corresponding to the first power attenuation value according to a first preset mapping relationship corresponding to the first power attenuation value;

determining a second reverberation time estimate corresponding to the second power attenuation value according to a second preset mapping relationship corresponding to the second power attenuation value; and determining, according to a third preset mapping relationship corresponding to the mean power fitting slope, a third reverberation time estimate corresponding to the mean power fitting slope.

The first reverberation time estimate is a reverberation time estimate determined according to the first power attenuation value and the preset mapping relationship between the first power attenuation value and the reverberation time estimate; the second reverberation time estimate is a reverberation time estimate determined according to the second power attenuation value and the preset mapping relationship between the second power attenuation value and the reverberation time estimate; the third reverberation time estimate is a reverberation time estimate determined according to the mean power fitting slope and the preset mapping relationship between the mean power fitting slope and the reverberation time estimate.

As an example, when determining the reverberation time estimate corresponding to each reverberation feature, the preset mapping relationship corresponding to each reverberation feature can be determined first, that is, the preset mapping relationship between the first power attenuation value and the reverberation time estimate can be determined, that is, the first preset mapping relationship; the preset mapping relationship between the second power attenuation value and the reverberation time estimate can be determined, that is, the second preset mapping relationship; the preset mapping relationship between the mean power fitting slope and the reverberation time estimate can be determined, that is, the third preset mapping relationship; Then, the reverberation time estimate corresponding to the first power attenuation value is determined according to the first power attenuation value and the first preset mapping relationship, that is, the first reverberation time estimate; the reverberation time estimate corresponding to the second power attenuation value is determined according to the second power attenuation value and the second preset mapping relationship, that is, the second reverberation time estimate; and the reverberation time estimate corresponding to the mean power fitting slope is determined according to the mean power fitting slope and the third preset mapping relationship, that is, the third reverberation time estimate.

As an example, each of the preset mapping relationships (that is, the first preset mapping relationship, the second preset mapping relationship, and the third preset mapping relationship) may be a statistical preset mapping relationship established based on the strong correlation relationship between each reverberation feature and the reverberation time by using a linear statistical model. In some implementations, the way to establish the preset mapping relationship may be as follows:

First, various historical speech signals and reverberation times of measured venues corresponding to the historical speech signals are obtained to form a measured sample library, where the measured sample library may include samples of various reverberation times. In addition, a certain number of measured samples (such as 68, 70, etc.) can be selected in the measured sample library to form a training sample library, and the measured samples in the measured sample library other than the training sample library can be used to form a test sample library.

Then, the preset mapping relationship between different reverberation features and reverberation times can be determined through a statistical model. Details are as follows:

Samples of the reverberation time smaller than or equal to the first preset threshold (for example, smaller than or equal to 250 ms) and their corresponding reverberation features are selected from the training sample library, the first power attenuation values of these samples are calculated, and the linear regression method is used to establish a first preset mapping relationship between the first power attenuation value and the reverberation time, and the preset mapping relationship may be a parameter of the mapping relationship between the first power attenuation value and the reverberation time, such as the first attenuation slope and a first attenuation intercept.

Samples of the reverberation time greater than or equal to the second preset threshold (for example, greater than or equal to 500 ms) and their corresponding reverberation features are selected from the training sample library, the second power attenuation values of these samples are calculated, and the linear regression method is used to establish a second preset mapping relationship between the second power attenuation value and the reverberation time, and the preset mapping relationship may be a parameter of the mapping relationship between the second power attenuation value and the reverberation time, such as a second attenuation slope and a second attenuation intercept.

Samples of the reverberation time greater than or equal to the second preset threshold (for example, greater than or equal to 500 ms) and their corresponding reverberation features are selected from the training sample library, the mean power fitting slope of these samples are calculated, and the linear regression method is used to establish a third preset mapping relationship between the mean power fitting slope and the reverberation time, and the preset mapping relationship may be a parameter of the mapping relationship between the mean power fitting slope and the reverberation time, such as a mean attenuation slope and a mean attenuation intercept.

Figure 2:
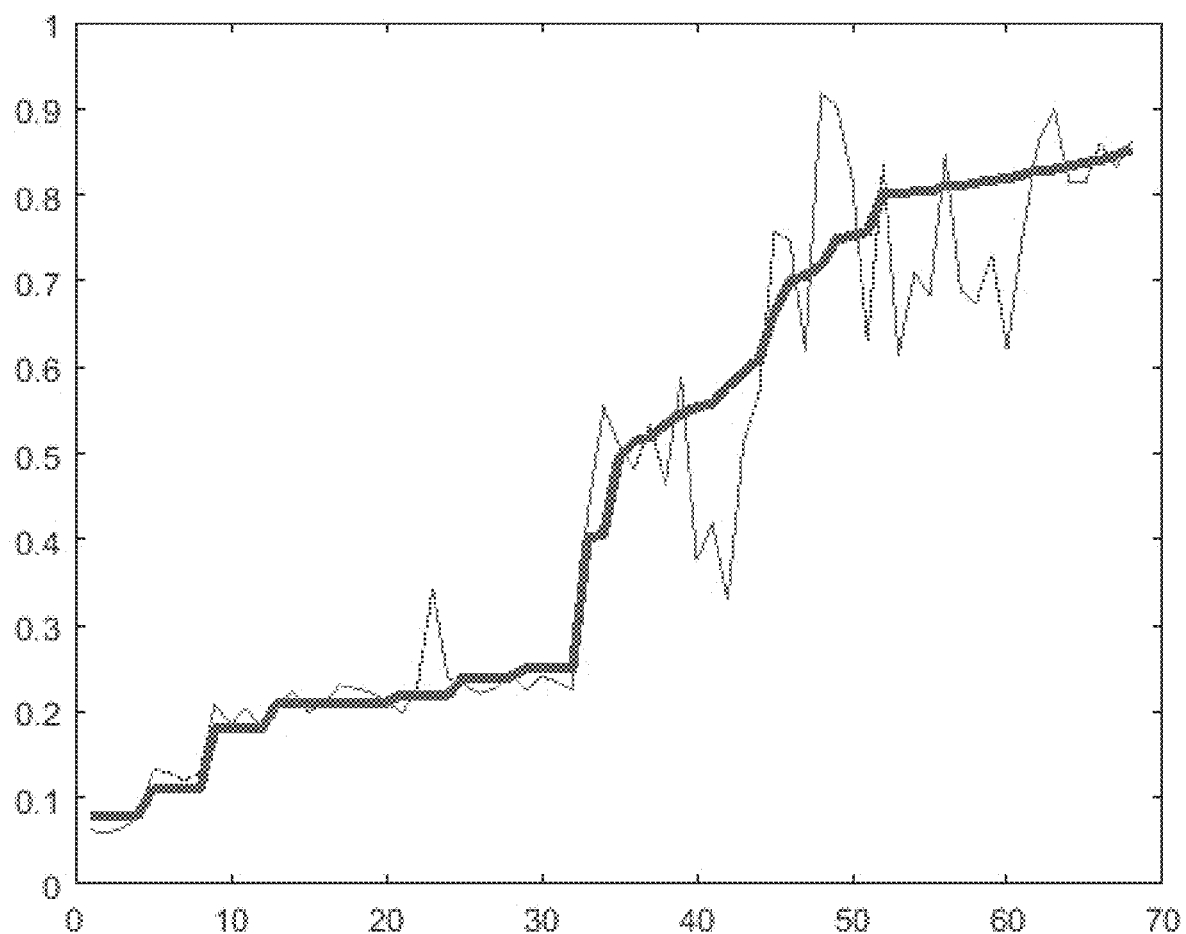
FIG. 2 is a schematic diagram of a correspondence between a real reverberation time and a reverberation time estimate obtained based on a preset mapping relationship provided by an embodiment of the present application.

Afterwards, the first preset mapping relationship between the first power attenuation value and the reverberation time, the second preset mapping relationship between the second power attenuation value and the reverberation time, and the third preset mapping relationship between the mean power fitting slope and the reverberation time can be verified to ensure the accuracy of each preset mapping relationship. Referring to FIG. 2, FIG. 2 shows a correspondence between a real reverberation time and a reverberation time estimate based on a preset mapping relationship. In FIG. 2, the thick solid line represents the real reverberation time, and the thin solid line represents the reverberation time estimate based on the preset mapping relationship. In FIG. 2, the vertical axis represents the reverberation time (unit: second), and the horizontal axis represents the sample number. The correspondence between the real reverberation time and the reverberation time estimate can be understood in combination with FIG. 2.

In this way, based on different preset mapping relationships between different reverberation features and reverberation times, the reverberation time estimates corresponding to different reverberation features are determined, which can improve the accuracy of the determined reverberation time estimates corresponding to different reverberation features, which can further improve the call quality:

In some embodiments, the implementation manner of the above step S130 may be as follows:

in a case that the first reverberation time estimate is smaller than or equal to a first preset threshold, determining the first reverberation time estimate as the global reverberation time;

in a case that the second reverberation time estimate and the third reverberation time estimate are both larger than or equal to the second preset threshold, determining the second reverberation time estimate as the global reverberation; and in a case that the first reverberation time estimate is greater than the first preset threshold and at least one of the second reverberation time estimate and the third reverberation time estimate is smaller than the second preset threshold, determining a mean value of the second reverberation time estimate and the third reverberation time estimate as the global reverberation time.

As an example, when determining the global reverberation time of the first target speech signal according to each reverberation time estimate, it may first be determined whether the first reverberation time estimate is smaller than or equal to a first preset threshold, for example, the first preset threshold may be 250 ms. In a case that the first reverberation time estimate is smaller than or equal to the first preset threshold, the first reverberation time estimate is determined as the global reverberation time.

If the first reverberation time estimate is greater than the first preset threshold, it may be determined whether the second reverberation time estimate and the third reverberation time estimate are both greater than or equal to the second preset threshold, for example, the first preset threshold can be 500 ms. In a case that the second reverberation time estimate and the third reverberation time estimate are both larger than or equal to the second preset threshold, the second reverberation time estimate may be determined as the global reverberation.

Otherwise, in a case that the first reverberation time estimate is greater than the first preset threshold and at least one of the second reverberation time estimate and the third reverberation time estimate is smaller than the second preset threshold, a mean value of the second reverberation time estimate and the third reverberation time estimate may be determined as the global reverberation time.

In this way, according to the specific numerical values of the first reverberation time estimate, the second reverberation time estimate, and the third reverberation time estimate, the global reverberation time of the first target speech signal can be determined, which can further improve the accuracy of the global reverberation time. Therefore, the accuracy of the adjusted length of the echo transfer function can be further improved, and the call quality can be improved.

In some embodiments, considering that although most of the echo of the near-end signal is canceled after echo cancellation once, because the filter corresponding to the echo transfer function has an offset, there is a small part of echo in the output signal. Therefore, echo cancellation may be performed for the second time to cancel the echo. Correspondingly, the length of the echo transfer function may include a first length of the echo transfer function and a second length of the echo transfer function. The implementation of the above step S150 can be as follows:

eliminating the echo of the first target speech signal according to the adjusted first length of the echo transfer function, to obtain a second target speech signal; and eliminating an echo of the second target speech signal according to the adjusted second length of the echo transfer function.

The first length of the echo transfer function may be the length of the echo transfer function for performing the first echo cancellation on the first target speech signal, for example, the first length of the echo transfer function may be the length of the adaptive filter.

The second length of the echo transfer function may be the length of the echo transfer function for performing the second echo cancellation on the first target speech signal, for example, the second length of the echo transfer function may be the length of the filter for remaining echo cancellation.

As an example, the second echo cancellation may be performed on the first target speech signal to ensure an echo cancellation effect. In some implementations, the echo of the first target speech signal may be eliminated first according to the adjusted first length of the echo transfer function, to obtain the speech signal after the first echo cancellation, that is, the second target speech signal. Then, echo cancellation is performed on the second target speech signal again according to the adjusted second length of the echo transfer function. For example, echo cancellation can be performed on the first target speech signal through the adjusted length of the adaptive filter, to obtain the second target speech signal, and then echo cancellation can be performed on the second target speech signal through the adjusted length of the filter for remaining echo cancellation.

In this way, on the one hand, using two echo transfer function lengths to perform echo cancellation on the first target speech signal can further improve the echo cancellation effect. On the other hand, since the two lengths of the echo transfer function are adjusted according to the global reverberation time, the adjusted two lengths of the echo transfer function are more in line with the actual situation of the first target speech signal, realizing dynamic adjustment of the lengths of two filters and further improving the echo cancellation effect.

It should be noted that, the echo cancellation method provided in the embodiment of the present application may be executed by an echo cancellation apparatus or, or a control module in the echo cancellation apparatus for executing the echo cancellation method. In the embodiment of the present application, the echo cancellation method provided by the embodiment of the present application is described by taking the echo cancellation method performed by the echo cancellation apparatus as an example.

Figure 3:
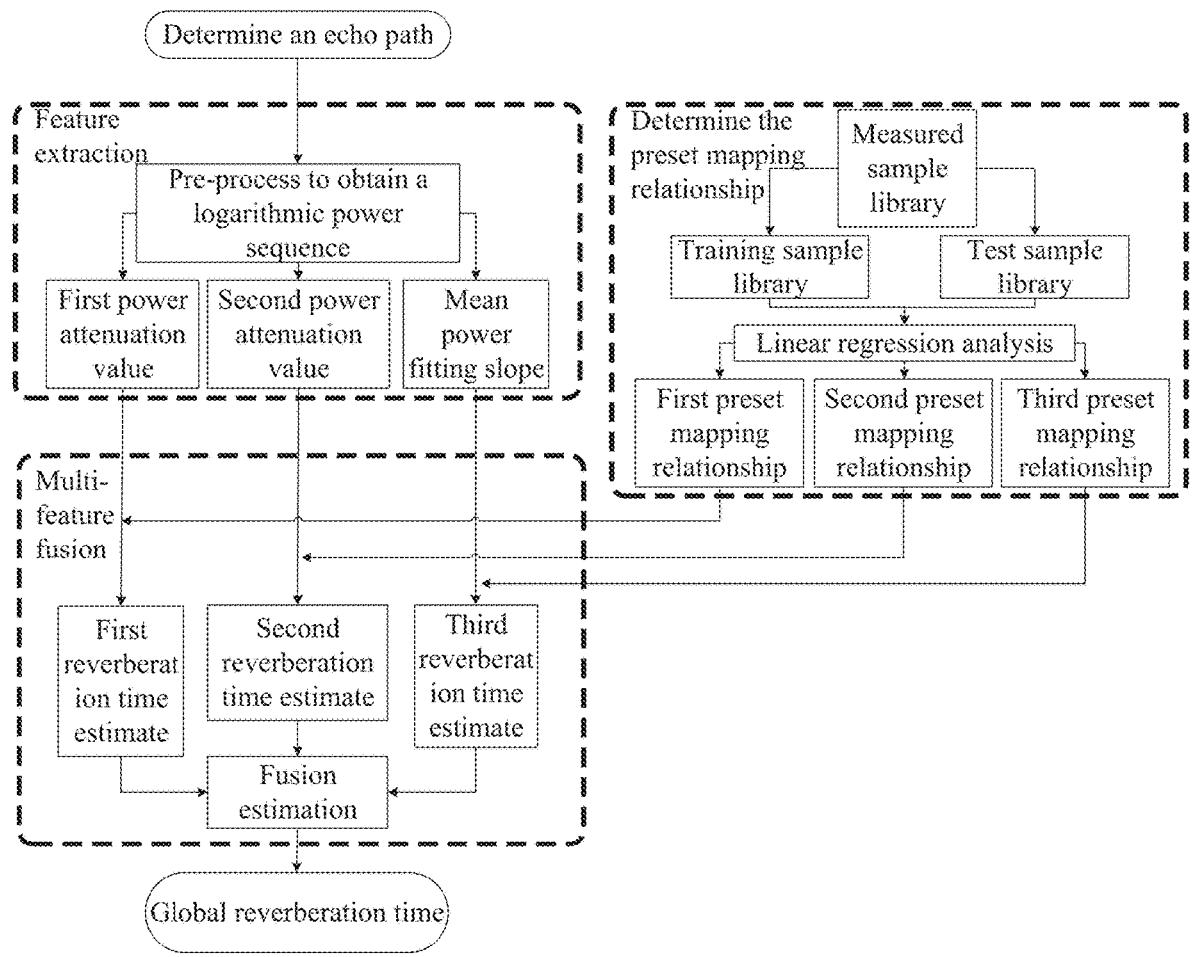
FIG. 3 is a flowchart of an echo cancellation method provided in an embodiment of the present application.

In order to make the echo cancellation method provided in the embodiment of the present application clearer, the echo cancellation method provided in the embodiment of the present application will be described below with reference to FIG. 3. As shown in FIG. 3, the echo cancellation method may include:

determining an echo path of the first target speech signal, performing feature extraction, determining a preset mapping relationship, and performing multi-feature fusion.

The feature extraction may include: performing preprocessing on the echo path to obtain a logarithmic power sequence of the echo path. Then, feature extraction is performed based on the logarithmic power sequence to obtain the first power attenuation value, the second power attenuation value and the mean power fitting slope related to the reverberation time in the first target speech signal.

Determining the preset mapping relationship may include: performing training based on the training sample library and the test sample library in the measured sample library through a statistical model, to determine the first preset mapping relationship, the second preset mapping relationship, and the third preset mapping relationship.

The multi-feature fusion may include: determining, according to the first preset mapping relationship corresponding to the first power attenuation value, the first reverberation time estimate corresponding to the first power attenuation value; determining, according to the second preset mapping relationship corresponding to the second power attenuation value, the second reverberation time estimate corresponding to the second power attenuation value; and determining, according to the third preset mapping relationship corresponding to the mean power fitting slope, the third reverberation time estimate corresponding to the mean power fitting slope. Afterwards, fusion estimation is performed on the first reverberation time estimate, the second reverberation time estimate, and the third reverberation time estimate to obtain the global reverberation time of the first target speech signal.

For the sake of brevity, the implementation principles and technical effects of the above-mentioned steps and the types of the above-mentioned method embodiments will not be repeated here.

Figure 4:
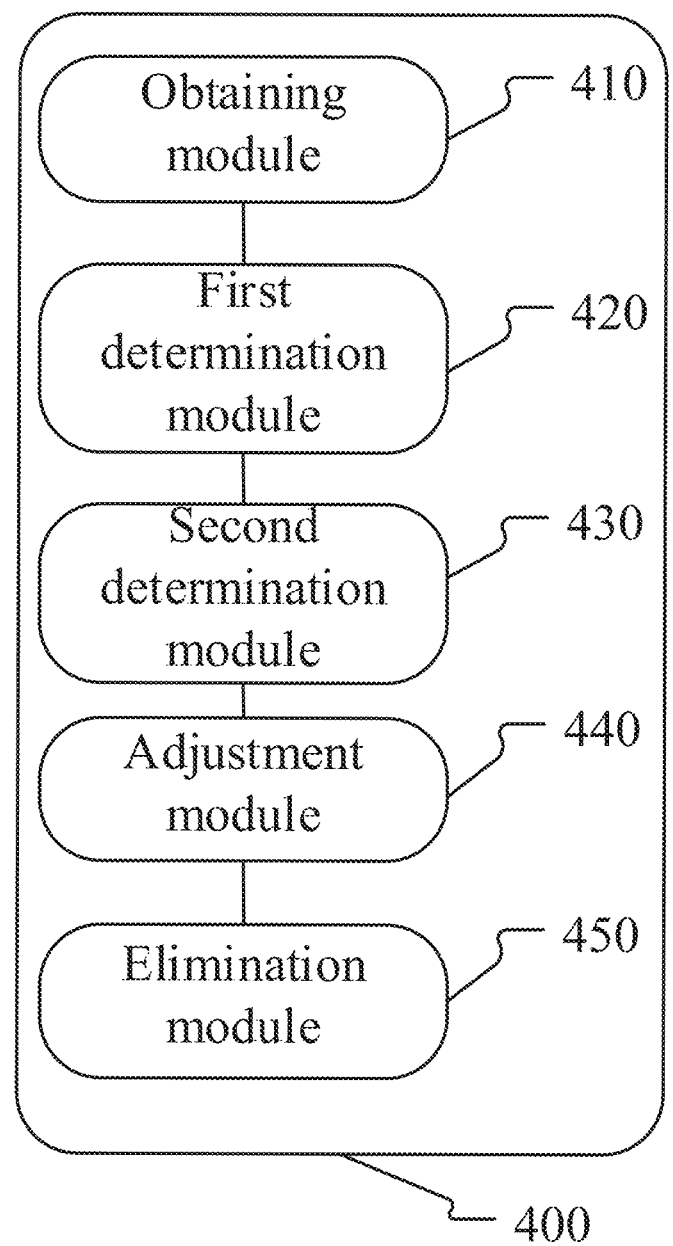
FIG. 4 is a block diagram of an echo cancellation apparatus provided by an embodiment of the present application.

The embodiment of the present application also provides an echo cancellation apparatus, and as shown in FIG. 4, the echo cancellation apparatus 400 may include:

an obtaining module 410, configured to obtain a plurality of reverberation features of a first target speech signal, where the plurality of reverberation features are a plurality of signal features related to reverberation times;

a first determination module 420, configured to respectively determine, according to each reverberation feature of the first target speech signal and a preset mapping relationship between the reverberation feature and a reverberation time estimate, the reverberation time estimate corresponding to each reverberation feature of the first target speech signal; where the preset mapping relationship between each reverberation feature of the first target speech signal and the reverberation time estimate is a mapping relationship obtained based on a corresponding reverberation feature of a historical speech signal and a reverberation time corresponding to the reverberation feature;

a second determination module 430, configured to determine a global reverberation time of the first target speech signal according to reverberation time estimates respectively corresponding to a plurality of reverberation features of the first target speech signal;

an adjustment module 440, configured to adjust a length of an echo transfer function according to the global reverberation time; and an elimination module 450, configured to eliminate an echo of the first target speech signal according to the adjusted length of the echo transfer function.

In the embodiments of the present application, the global reverberation time is determined according to the reverberation time estimates corresponding to the plurality of reverberation features related to reverberation times in the first target speech signal, and the length of the echo transfer function is adjusted based on the global reverberation time, so as to eliminate the echo of the first target speech signal according to the adjusted length of the echo transfer function, and the reverberation time estimate corresponding to each reverberation feature is determined based on each reverberation feature and the preset mapping relationship between the reverberation feature and the reverberation time estimate. In this way, adjusting the length of the echo transfer function based on the global reverberation time of the first target speech signal can realize dynamic control of the length of the echo transfer function, so that the length of the echo transfer function can better meet actual needs. In this way, not only can the waste of resources caused by the long length of the echo transfer function be avoided, but also the poor effect of echo cancellation caused by the short length of the echo transfer function can be avoided, thereby better improving call quality and user experience.

In some embodiments, the obtaining module 410 may include:

a first determination unit, configured to determine an echo path of the first target speech signal;

a processing unit, configured to remove power with a value of zero among power of the echo path to obtain the logarithmic power sequence of the echo path; where the logarithmic power sequence includes Q sequence segments, and Q is a positive integer; and an obtaining unit, configured to obtain a plurality of reverberation features based on logarithmic power in different sequence segments. In this way, based on the power of different sequence segments in the Q sequence segments of the logarithmic power sequence, the plurality of reverberation features can be obtained, so that the obtained plurality of reverberation features can better represent power characteristics of different sequence segments of the first target speech signal, which can provide a more accurate data basis for the determination of the global reverberation time, and can further make the length of the echo transfer function more in line with actual needs and improve call quality and user experience.

In some embodiments, the plurality of signal features may include a first power attenuation value, a second power attenuation value, and a mean power fitting slope.

The first power attenuation value is a power attenuation value of the first N sequence segments in the Q sequence segments; the second power attenuation value is the power attenuation value of the L sequence segments after the $(N-1)^{th}$ sequence segment in the Q sequence segments; and the mean power fitting slope is obtained through fitting based on the mean logarithmic power sequence of the logarithmic power sequence.

In some embodiments, the obtaining unit may include:

a first calculation subunit, configured to calculate at least one first difference sequence of every two adjacent sequence segments of the first N sequence segments of the Q sequence segments; where N is a positive integer and N<Q;

a first determination subunit, configured to determine a first power attenuation value according to the first difference sequence;

a second calculation subunit, configured to calculate at least one second difference sequence of every two adjacent sequence segments of L sequence segments of the Q sequence segments; where the L sequence segments are L sequence segments after the $(N-1)^{th}$ sequence segment of the Q sequence segments, and L is a positive integer;

a second determination subunit, configured to determine a second power attenuation value according to the second difference sequence;

a processing subunit, configured to process the logarithmic power sequence by an FIR filter to obtain a mean logarithmic power sequence of the logarithmic power sequence;

a selection subunit, configured to select a continuous power sequence segment within a preset interval range in the mean logarithmic power sequence; and a fitting subunit, configured to obtain a mean power fitting slope through fitting according to the continuous power sequence segment.

In this way, determining the first power attenuation value, the second power attenuation value, and the mean power fitting slope based on different sequence segments of the Q sequence segments of the logarithmic power sequence can make the acquired reverberation features more accurately represent the power features of different sequence segments of the first target speech signal, and provide a more accurate data basis for determining the global reverberation time, which can further make the length of the echo transfer function more in line with actual needs and improve call quality and user experience.

In some embodiments, the second determining module 430 may include:

a second determination unit, configured to: in a case that the first reverberation time estimate is smaller than or equal to a first preset threshold, determine the first reverberation time estimate as the global reverberation time; where the first reverberation time estimate is a reverberation time estimate determined according to the first power attenuation value and the preset mapping relationship between the first power attenuation value and the reverberation time estimate;

a third determination unit, configured to: in a case that both the second reverberation time estimate and the third reverberation time estimate are greater than or equal to a second preset threshold, determine the second reverberation time estimate as the global reverberation time; where the second reverberation time estimate is a reverberation time estimate determined according to the second power attenuation value and the preset mapping relationship between the second power attenuation value and the reverberation time estimate; and the third reverberation time estimate is a reverberation time estimate determined according to the mean power fitting slope and the preset mapping relationship between the mean power fitting slope and the reverberation time estimate; and a fourth determination unit, configured to: in a case that the first reverberation time estimate is greater than the first preset threshold and at least one of the second reverberation time estimate and the third reverberation time estimate is smaller than the second preset threshold, determine a mean value of the second reverberation time estimate and the third reverberation time estimate as the global reverberation time.

In this way, according to the specific numerical values of the first reverberation time estimate, the second reverberation time estimate, and the third reverberation time estimate, the global reverberation time of the first target speech signal can be determined, which can further improve the accuracy of the global reverberation time. Therefore, the accuracy of the adjusted length of the echo transfer function can be further improved, and the call quality can be improved.

In some embodiments, the length of the echo transfer function may include a first length of the echo transfer function and a second length of the echo transfer function; and The elimination module 450 may include:

a first elimination unit, configured to eliminate the echo of the first target speech signal according to the adjusted first length of the echo transfer function, to obtain a second target speech signal; and a second elimination unit, configured to eliminate an echo of the second target speech signal according to the adjusted second length of the echo transfer function.

In this way, on the one hand, using two echo transfer function lengths to perform echo cancellation on the first target speech signal can further improve the echo cancellation effect. On the other hand, since the two lengths of the echo transfer function are adjusted according to the global reverberation time, the adjusted two lengths of the echo transfer function are more in line with the actual situation of the first target speech signal, realizing dynamic adjustment of the lengths of two filters and further improving the echo cancellation effect.

The echo cancellation apparatus in the embodiments of the present application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted electronic device, a wearable device, an Ultra-Mobile Personal Computer (UMPC), a netbook, a Personal Digital Assistant (PDA), or the like. The non-mobile electronic device may be a server, a Network Attached Storage (NAS), a personal computer, a television, a teller machine, a self-service machine, or the like. This is not specifically limited in the embodiments of this application.

The echo cancellation apparatus in this embodiment of the present application may be a device with an operating system. The operating system may be an Android operating system, may be an iOS operating system, or may be another possible operating system. This is not specifically limited in this embodiment of this application.

The echo cancellation apparatus provided in this embodiment of the present application can implement processes implemented by the echo cancellation apparatus in the method embodiments of FIG. 1 to FIG. 3. To avoid repetition, details are not described herein again.

Figure 5:
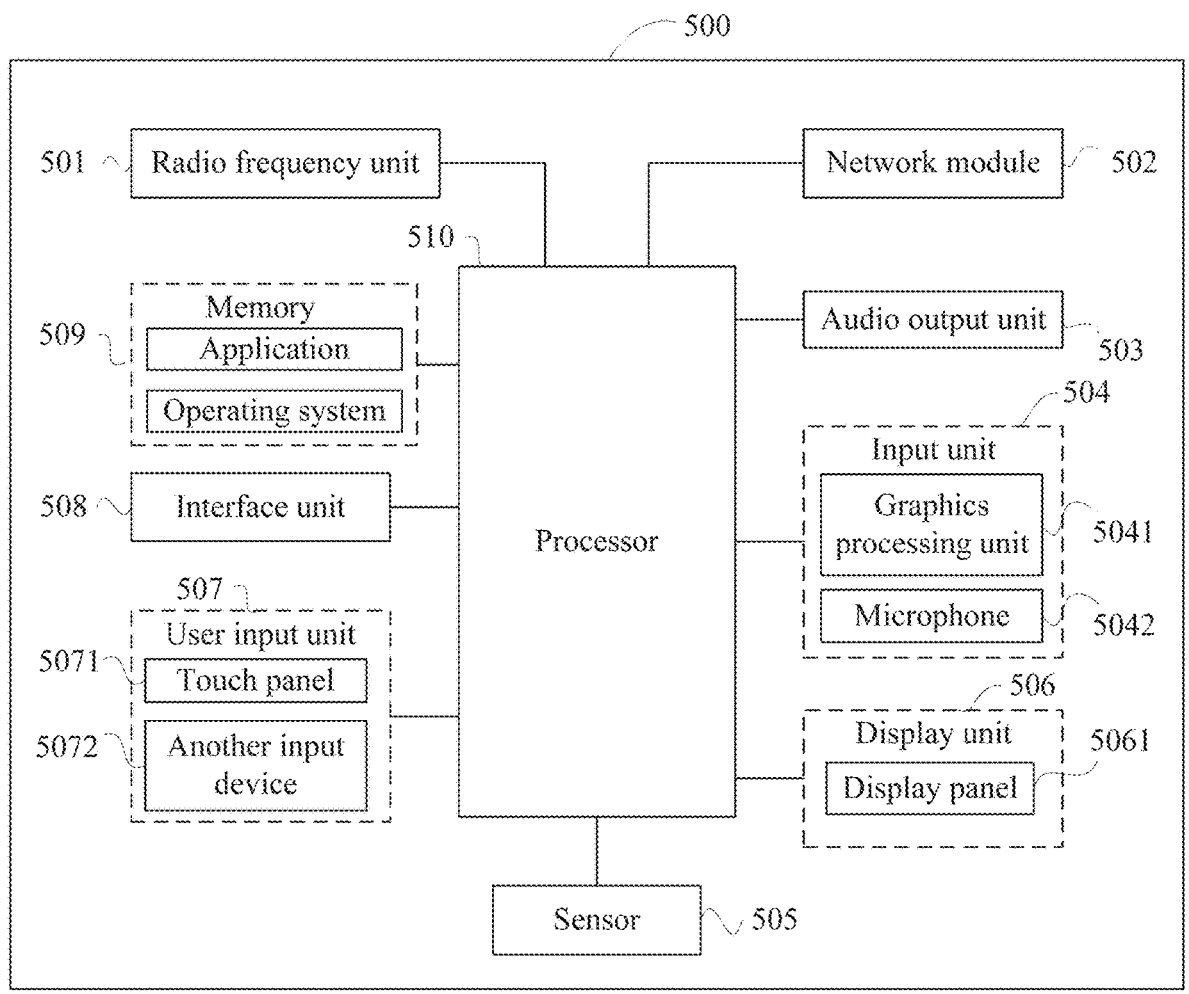
FIG. 5 is a block diagram of an electronic device provided by an embodiment of this application.

The embodiment of the present application also provides an electronic device. As shown in FIG. 5, the electronic device 500 may include a processor 510, a memory 509, and a program or an instruction stored in the memory 509 and executable on the processor 510, and the program or the instruction, when executed by the processor 510, implements the various processes of the embodiment of the echo cancellation method described above, and can achieve the same technical effect. To avoid repetition, details are not repeated herein.

It should be noted that the electronic device in this embodiment of this application includes the foregoing mobile electronic device and the foregoing non-mobile electronic device.

The electronic device 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

It may be understood by a person skilled in the art that the electronic device 500 may further include a power supply (such as a battery) that supplies power to each component. The power supply may be logically connected to the processor 510 by using a power management system, to implement functions such as charging, discharging, and power consumption management by using the power management system, A structure of the electronic device shown in FIG. 5 does not constitute a limitation on the electronic device, and may include more or fewer components than those shown in the figure, or combine some components, or have different part arrangements. Details are not described herein again.

The processor 510 is configured to:

obtain a plurality of reverberation features of a first target speech;

respectively determine, according to a preset mapping relationship between each reverberation feature of the first target speech signal and a reverberation time estimate, a reverberation time estimate corresponding to each reverberation feature of the first target speech;

determine a global reverberation time of the first target speech signal according to reverberation time estimates respectively corresponding to a plurality of reverberation features of the first target speech signal;

adjust a length of an echo transfer function according to the global reverberation time; and eliminate an echo of the first target speech signal according to the adjusted length of the echo transfer function.

In the embodiments of the present application, the global reverberation time is determined according to the reverberation time estimates corresponding to the plurality of reverberation features related to reverberation times in the first target speech signal, and the length of the echo transfer function is adjusted based on the global reverberation time, so as to eliminate the echo of the first target speech signal according to the adjusted length of the echo transfer function, and the reverberation time estimate corresponding to each reverberation feature is determined based on each reverberation feature and the preset mapping relationship between the reverberation feature and the reverberation time estimate. In this way, adjusting the length of the echo transfer function based on the global reverberation time of the first target speech signal can realize dynamic control of the length of the echo transfer function, so that the length of the echo transfer function can better meet actual needs. In this way, not only can the waste of resources caused by the long length of the echo transfer function be avoided, but also the poor effect of echo cancellation caused by the short length of the echo transfer function can be avoided, thereby better improving call quality and user experience.

In some implementations, the processor 510 is further configured to:
  determine an echo path of the first target speech signal;
  remove power with a value of zero among power of the echo path to obtain the logarithmic power sequence of the echo path; and
  obtain a plurality of reverberation features based on logarithmic power in different sequence segments.

In this way, based on the power of different sequence segments in the Q sequence segments of the logarithmic power sequence, the plurality of reverberation features can be obtained, so that the obtained plurality of reverberation features can better represent power characteristics of different sequence segments of the first target speech signal, which can provide a more accurate data basis for the determination of the global reverberation time, and can further make the length of the echo transfer function more in line with actual needs and improve call quality and user experience.

In some implementations, the processor 510 is further configured to:
  calculate at least one first difference sequence of every two adjacent sequence segments of the first N sequence segments of the Q sequence segments;
  determine a first power attenuation value according to the first difference sequence;
  calculate at least one second difference sequence of every two adjacent sequence segments of L sequence segments of the Q sequence segments;
  determine a second power attenuation value according to the second difference sequence;
  process the logarithmic power sequence by an FIR filter to obtain a mean logarithmic power sequence of the logarithmic power sequence;
  select a continuous power sequence segment within a preset interval range in the mean logarithmic power sequence; and
  obtain a mean power fitting slope through fitting according to the continuous power sequence segment.

In this way, determining the first power attenuation value, the second power attenuation value, and the mean power fitting slope based on different sequence segments of the Q sequence segments of the logarithmic power sequence can make the acquired reverberation features more accurately represent the power features of different sequence segments of the first target speech signal, and provide a more accurate data basis for determining the global reverberation time, which can further make the length of the echo transfer function more in line with actual needs and improve call quality and user experience.

In some implementations, the processor 510 is further configured to:
  in a case that the first reverberation time estimate is smaller than or equal to a first preset threshold, determine the first reverberation time estimate as the global reverberation time;
  in a case that the second reverberation time estimate and the third reverberation time estimate are both larger than or equal to the second preset threshold, determine the second reverberation time estimate as the global reverberation; and
  in a case that the first reverberation time estimate is greater than the first preset threshold and at least one of the second reverberation time estimate and the third reverberation time estimate is smaller than the second preset threshold, determine a mean value of the second reverberation time estimate and the third reverberation time estimate as the global reverberation time.

In this way, according to the specific numerical values of the first reverberation time estimate, the second reverberation time estimate, and the third reverberation time estimate, the global reverberation time of the speech signal can be determined, which can further improve the accuracy of the global reverberation time. Therefore, the accuracy of the adjusted length of the echo transfer function can be further improved, and the call quality can be improved.

In some implementations, the processor 510 is further configured to:
  eliminate the echo of the first target speech signal according to the adjusted first length of the echo transfer function, to obtain a second target speech signal; and
  eliminate an echo of the second target speech signal according to the adjusted second length of the echo transfer function.

In this way, on the one hand, using two echo transfer function lengths to perform echo cancellation on the first target speech signal can further improve the echo cancellation effect. On the other hand, since the two lengths of the echo transfer function are adjusted according to the global reverberation time, the adjusted two lengths of the echo transfer function are more in line with the actual situation of the first target speech signal, realizing dynamic adjustment of the lengths of two filters and further improving the echo cancellation effect.

An embodiment of the present application further provides a readable storage medium. The readable storage medium stores a program or an instruction, and when the program or the instruction is executed by a processor, the various processes of the foregoing echo cancellation method embodiment is performed and the same technical effects can be achieved. To avoid repetition, details are not described herein again.

The processor is a processor in the electronic device in the foregoing embodiment. Specifically, the processor may include a Central Processing Unit (CPU), or an Application-Specific Integrated Circuit (A SIC), or may be one or more integrated circuits configured to implement the embodiments of the present application. The readable storage medium includes a computer-readable storage medium, such as a computer Read-Only Memory (ROM), a Random Access Memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing echo cancellation method and the same technical effects can be achieved. To avoid repetition, details are not described herein again.

It should be understood that the chip mentioned in this embodiment of this application may also be referred to as a system-level chip, a system chip, a system on chip, a system on chip, and the like.

It should be noted that in this specification, the term "include," "comprise," or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Aspects of this application are described with reference to a flowchart and/or a block diagram of a method, an apparatus (system), and a computer program product according to embodiments of this application. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It may be further understood that each block in the block diagram and/or flowchart and a combination of blocks in the block diagram and/or flowchart may be implemented by dedicated hardware that performs a specified function or action, or may be implemented by a combination of dedicated hardware and a computer instruction.

Based on the descriptions of the foregoing implementations, a person skilled in the art may understand that the method in the foregoing embodiment may be implemented by software in addition to a necessary universal hardware platform or by hardware only. Based on such an understanding, the technical solutions of this application essentially or the part contributing to the related art may be implemented in a form of a software product. The computer software product is stored in a storage medium (such as a ROM/RAM, a magnetic disk, or an optical disc) and includes several instructions for instructing a terminal (which may be a mobile phone, a computer, a server, or a network device) to execute the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. An echo cancellation method, comprising:
   obtaining a plurality of reverberation features of a first target speech signal, wherein the plurality of reverberation features are a plurality of signal features related to reverberation times;
   respectively determining, according to each reverberation feature of the first target speech signal and a preset mapping relationship between the reverberation feature and a reverberation time estimate, the reverberation time estimate corresponding to each reverberation feature of the first target speech signal, wherein the preset mapping relationship between each reverberation feature of the first target speech signal and the reverberation time estimate is a mapping relationship obtained based on a corresponding reverberation feature of a historical speech signal and a reverberation time corresponding to the reverberation feature;
   determining a global reverberation time of the first target speech signal according to reverberation time estimates respectively corresponding to the plurality of reverberation features of the first target speech signal;
   adjusting a length of an echo transfer function according to the global reverberation time; and
   eliminating an echo of the first target speech signal according to the adjusted length of the echo transfer function.

2. The echo cancellation method according to claim 1, wherein the obtaining a plurality of reverberation features of a first target speech signal comprises:
   determining an echo path of the first target speech signal;
   removing power with a value of zero among power of the echo path to obtain the logarithmic power sequence of the echo path, wherein the logarithmic power sequence comprises Q sequence segments, and Q is a positive integer; and
   obtaining a plurality of reverberation features based on logarithmic power in different sequence segments.

3. The echo cancellation method according to claim 2, wherein the plurality of reverberation features comprise a first power attenuation value, a second power attenuation value, and a mean power fitting slope,
   wherein the first power attenuation value is a power attenuation value of the first N sequence segments in the Q sequence segments,
   wherein the second power attenuation value is the power attenuation value of the L sequence segments after the (N−1)th sequence segment in the Q sequence segments, and
   wherein the mean power fitting slope is obtained through fitting based on the mean logarithmic power sequence of the logarithmic power sequence.

4. The echo cancellation method according to claim 3, wherein the obtaining a plurality of reverberation features based on logarithmic power in different sequence comprises:
   calculating at least one first difference sequence of every two adjacent sequence segments of the first N sequence segments of the Q sequence segments, wherein N is a positive integer and N<Q;
   determining the first power attenuation value according to the first difference sequence;
   calculating at least one second difference sequence of every two adjacent sequence segments of L sequence segments of the Q sequence segments, wherein the L sequence segments are L sequence segments after the (N−1)th sequence segment of the Q sequence segments, and L is a positive integer;

determining the second power attenuation value according to the second difference sequence;
processing the logarithmic power sequence by a Finite Impulse Response (FIR) filter to obtain a mean logarithmic power sequence of the logarithmic power sequence;
selecting a continuous power sequence segment within a preset interval range in the mean logarithmic power sequence; and
obtaining a mean power fitting slope through fitting according to the continuous power sequence segment.

5. The echo cancellation method according to claim 3, wherein the determining a global reverberation time of the first target speech signal according to reverberation time estimates respectively corresponding to the plurality of reverberation features of the first target speech signal comprises:
when a first reverberation time estimate is smaller than or equal to a first preset threshold, determining the first reverberation time estimate as the global reverberation time, wherein the first reverberation time estimate is a reverberation time estimate determined according to the first power attenuation value and the preset mapping relationship between the first power attenuation value and the reverberation time estimate;
when both a second reverberation time estimate and a third reverberation time estimate are greater than or equal to a second preset threshold, determining the second reverberation time estimate as the global reverberation time, wherein the second reverberation time estimate is a reverberation time estimate determined according to the second power attenuation value and the preset mapping relationship between the second power attenuation value and the reverberation time estimate, and the third reverberation time estimate is a reverberation time estimate determined according to the mean power fitting slope and the preset mapping relationship between the mean power fitting slope and the reverberation time estimate; and
when the first reverberation time estimate is greater than the first preset threshold and at least one of the second reverberation time estimate and the third reverberation time estimate is smaller than the second preset threshold, determining a mean value of the second reverberation time estimate and the third reverberation time estimate as the global reverberation time.

6. The echo cancellation method according to claim 1, wherein the length of the echo transfer function comprises a first length of the echo transfer function and a second length of the echo transfer function,
wherein the eliminating an echo of the first target speech signal according to the adjusted length of the echo transfer function comprises:
eliminating the echo of the first target speech signal according to the adjusted first length of the echo transfer function, to obtain a second target speech signal; and
eliminating an echo of the second target speech signal according to the adjusted second length of the echo transfer function.

7. An electronic device, comprising:
a memory storing computer-readable instructions; and
a processor coupled to the memory and configured to execute the computer-readable instructions, wherein the computer-readable instructions, when executed by the processor, cause the processor to perform operations comprising:
obtaining a plurality of reverberation features of a first target speech signal, wherein the plurality of reverberation features are a plurality of signal features related to reverberation times;
respectively determining, according to each reverberation feature of the first target speech signal and a preset mapping relationship between the reverberation feature and a reverberation time estimate, the reverberation time estimate corresponding to each reverberation feature of the first target speech signal, wherein the preset mapping relationship between each reverberation feature of the first target speech signal and the reverberation time estimate is a mapping relationship obtained based on a corresponding reverberation feature of a historical speech signal and a reverberation time corresponding to the reverberation feature;
determining a global reverberation time of the first target speech signal according to reverberation time estimates respectively corresponding to the plurality of reverberation features of the first target speech signal;
adjusting a length of an echo transfer function according to the global reverberation time; and
eliminating an echo of the first target speech signal according to the adjusted length of the echo transfer function.

8. The electronic device according to claim 7, wherein the obtaining a plurality of reverberation features of a first target speech signal comprises:
determining an echo path of the first target speech signal;
removing power with a value of zero among power of the echo path to obtain the logarithmic power sequence of the echo path, wherein the logarithmic power sequence comprises Q sequence segments, and Q is a positive integer; and
obtaining a plurality of reverberation features based on logarithmic power in different sequence segments.

9. The electronic device according to claim 8, wherein the plurality of reverberation features comprise a first power attenuation value, a second power attenuation value, and a mean power fitting slope,
wherein the first power attenuation value is a power attenuation value of the first N sequence segments in the Q sequence segments,
wherein the second power attenuation value is the power attenuation value of the L sequence segments after the (N−1)th sequence segment in the Q sequence segments, and
wherein the mean power fitting slope is obtained through fitting based on the mean logarithmic power sequence of the logarithmic power sequence.

10. The electronic device according to claim 9, wherein the obtaining a plurality of reverberation features based on logarithmic power in different sequence comprises:
calculating at least one first difference sequence of every two adjacent sequence segments of the first N sequence segments of the Q sequence segments, wherein N is a positive integer and N<Q;
determining the first power attenuation value according to the first difference sequence;
calculating at least one second difference sequence of every two adjacent sequence segments of L sequence segments of the Q sequence segments, wherein the L sequence segments are L sequence segments after the (N−1)th sequence segment of the Q sequence segments, and L is a positive integer;
determining the second power attenuation value according to the second difference sequence;

processing the logarithmic power sequence by a Finite Impulse Response (FIR) filter to obtain a mean logarithmic power sequence of the logarithmic power sequence;

selecting a continuous power sequence segment within a preset interval range in the mean logarithmic power sequence; and obtaining a mean power fitting slope through fitting according to the continuous power sequence segment.

11. The electronic device according to claim 9, wherein the determining a global reverberation time of the first target speech signal according to reverberation time estimates respectively corresponding to the plurality of reverberation features of the first target speech signal comprises:

when a first reverberation time estimate is smaller than or equal to a first preset threshold, determining the first reverberation time estimate as the global reverberation time, wherein the first reverberation time estimate is a reverberation time estimate determined according to the first power attenuation value and the preset mapping relationship between the first power attenuation value and the reverberation time estimate;

when both a second reverberation time estimate and a third reverberation time estimate are greater than or equal to a second preset threshold, determining the second reverberation time estimate as the global reverberation time, wherein the second reverberation time estimate is a reverberation time estimate determined according to the second power attenuation value and the preset mapping relationship between the second power attenuation value and the reverberation time estimate, and the third reverberation time estimate is a reverberation time estimate determined according to the mean power fitting slope and the preset mapping relationship between the mean power fitting slope and the reverberation time estimate; and when the first reverberation time estimate is greater than the first preset threshold and at least one of the second reverberation time estimate and the third reverberation time estimate is smaller than the second preset threshold, determining a mean value of the second reverberation time estimate and the third reverberation time estimate as the global reverberation time.

12. The electronic device according to claim 7, wherein the length of the echo transfer function comprises a first length of the echo transfer function and a second length of the echo transfer function, wherein the eliminating an echo of the first target speech signal according to the adjusted length of the echo transfer function comprises:

eliminating the echo of the first target speech signal according to the adjusted first length of the echo transfer function, to obtain a second target speech signal; and eliminating an echo of the second target speech signal according to the adjusted second length of the echo transfer function.

13. A non-transitory computer-readable medium, storing instructions that, when executed by a processor, cause the processor to perform operations comprising:

obtaining a plurality of reverberation features of a first target speech signal, wherein the plurality of reverberation features are a plurality of signal features related to reverberation times;

respectively determining, according to each reverberation feature of the first target speech signal and a preset mapping relationship between the reverberation feature and a reverberation time estimate, the reverberation time estimate corresponding to each reverberation feature of the first target speech signal, wherein the preset mapping relationship between each reverberation feature of the first target speech signal and the reverberation time estimate is a mapping relationship obtained based on a corresponding reverberation feature of a historical speech signal and a reverberation time corresponding to the reverberation feature;

determining a global reverberation time of the first target speech signal according to reverberation time estimates respectively corresponding to the plurality of reverberation features of the first target speech signal;

adjusting a length of an echo transfer function according to the global reverberation time; and eliminating an echo of the first target speech signal according to the adjusted length of the echo transfer function.

14. The non-transitory computer-readable medium according to claim 13, wherein the obtaining a plurality of reverberation features of a first target speech signal comprises:

determining an echo path of the first target speech signal;

removing power with a value of zero among power of the echo path to obtain the logarithmic power sequence of the echo path, wherein the logarithmic power sequence comprises Q sequence segments, and Q is a positive integer; and obtaining a plurality of reverberation features based on logarithmic power in different sequence segments.

15. The non-transitory computer-readable medium according to claim 14, wherein the plurality of reverberation features comprise a first power attenuation value, a second power attenuation value, and a mean power fitting slope, wherein the first power attenuation value is a power attenuation value of the first N sequence segments in the Q sequence segments, wherein the second power attenuation value is the power attenuation value of the L sequence segments after the (N−1)th sequence segment in the Q sequence segments, and wherein the mean power fitting slope is obtained through fitting based on the mean logarithmic power sequence of the logarithmic power sequence.

16. The non-transitory computer-readable medium according to claim 15, wherein the obtaining a plurality of reverberation features based on logarithmic power in different sequence comprises:

calculating at least one first difference sequence of every two adjacent sequence segments of the first N sequence segments of the Q sequence segments, wherein N is a positive integer and N<Q;

determining the first power attenuation value according to the first difference sequence;

calculating at least one second difference sequence of every two adjacent sequence segments of L sequence segments of the Q sequence segments, wherein the L sequence segments are L sequence segments after the (N−1)th sequence segment of the Q sequence segments, and L is a positive integer;

determining the second power attenuation value according to the second difference sequence;

processing the logarithmic power sequence by a Finite Impulse Response (FIR) filter to obtain a mean logarithmic power sequence of the logarithmic power sequence;

selecting a continuous power sequence segment within a preset interval range in the mean logarithmic power sequence; and obtaining a mean power fitting slope through fitting according to the continuous power sequence segment.

17. The non-transitory computer-readable medium according to claim 15, wherein the determining a global reverberation time of the first target speech signal according to reverberation time estimates respectively corresponding to the plurality of reverberation features of the first target speech signal comprises:

when a first reverberation time estimate is smaller than or equal to a first preset threshold, determining the first reverberation time estimate as the global reverberation time, wherein the first reverberation time estimate is a reverberation time estimate determined according to the first power attenuation value and the preset mapping relationship between the first power attenuation value and the reverberation time estimate;

when both a second reverberation time estimate and a third reverberation time estimate are greater than or equal to a second preset threshold, determining the second reverberation time estimate as the global reverberation time, wherein the second reverberation time estimate is a reverberation time estimate determined according to the second power attenuation value and the preset mapping relationship between the second power attenuation value and the reverberation time estimate, and the third reverberation time estimate is a reverberation time estimate determined according to the mean power fitting slope and the preset mapping relationship between the mean power fitting slope and the reverberation time estimate; and when the first reverberation time estimate is greater than the first preset threshold and at least one of the second reverberation time estimate and the third reverberation time estimate is smaller than the second preset threshold, determining a mean value of the second reverberation time estimate and the third reverberation time estimate as the global reverberation time.

18. The non-transitory computer-readable medium according to claim 13, wherein the length of the echo transfer function comprises a first length of the echo transfer function and a second length of the echo transfer function, wherein the eliminating an echo of the first target speech signal according to the adjusted length of the echo transfer function comprises:

eliminating the echo of the first target speech signal according to the adjusted first length of the echo transfer function, to obtain a second target speech signal; and eliminating an echo of the second target speech signal according to the adjusted second length of the echo transfer function.

* * * * *